(12) United States Patent
Hosemans

(10) Patent No.: US 7,852,471 B2
(45) Date of Patent: Dec. 14, 2010

(54) POWER GENERATOR FOR SPECTROMETRY

(75) Inventor: Steven William Hosemans, Upwey (AU)

(73) Assignee: Varian Australia Pty Ltd, Mulgrave, Victoria (AU)

( * ) Notice: Subject to any disclaimer, the term of this patent is extended or adjusted under 35 U.S.C. 154(b) by 194 days.

(21) Appl. No.: 12/300,783

(22) PCT Filed: May 9, 2007

(86) PCT No.: PCT/AU2007/000610

§ 371 (c)(1),
(2), (4) Date: Nov. 13, 2008

(87) PCT Pub. No.: WO2007/134363

PCT Pub. Date: Nov. 29, 2007

(65) Prior Publication Data

US 2009/0129131 A1    May 21, 2009

(30) Foreign Application Priority Data

May 22, 2006 (AU) .............................. 2006902749

(51) Int. Cl.
*G01N 21/73* (2006.01)
(52) U.S. Cl. ................... 356/316; 315/111.51
(58) Field of Classification Search ............... 356/316; 315/111.51
See application file for complete search history.

(56) References Cited

U.S. PATENT DOCUMENTS

| 3,939,422 A | 2/1976 | Deise |
| 6,175,198 B1 | 1/2001 | Nerone |
| 2006/0017388 A1 | 1/2006 | Stevenson |

FOREIGN PATENT DOCUMENTS

CN            1505250 A         6/2004

*Primary Examiner*—F. L Evans
(74) *Attorney, Agent, or Firm*—Bella Fishman

(57) ABSTRACT

An RF power generator (10) for an induction coil (26) for exciting an inductively coupled plasma in a torch (27) for spectrometry. The generator (10) comprises a switching circuit (12) for alternately switching ON and OFF solid state switching devices (20) via gate drive voltages (22) for supplying RF power into a resonant load circuit (16) comprising the induction coil (26) and parallel connected capacitance (25). The gate drive circuits (24) for each solid state switching device (20) each include a portion (30) that is mutually inductively coupled with leads of the induction coil (26) to provide the gate drive voltages (22). The circuit allows for reduced componentry and therefore a relatively inexpensive RF power generator for exciting and sustaining an inductively coupled plasma for spectrometry.

13 Claims, 6 Drawing Sheets

POWER GENERATOR FOR SPECTROMETRY

CROSS-REFERENCE TO RELATED APPLICATIONS

This application is claiming priority of Australian Patent Application No. 2006902749, filed May 22, 2006.

TECHNICAL FIELD

The present invention relates to a radio frequency (RF) power generator for an induction coil for exciting an inductively coupled plasma (ICP) for spectrometry.

BACKGROUND

A reference herein to a patent document or other matter which is given as prior art is not to be taken as an admission that that document or matter was, in Australia, known or that the information it contains was part of the common general knowledge as at the priority date established by the present application.

In spectrometry, an ICP may be used as a source of ions for mass spectrometry (MS) or as a source of light for atomic optical emission spectrometry (OES). The ICP apparatus may consist of one or more water-cooled induction coils mounted coaxially with a torch assembly through which argon gas is introduced at carefully controlled rates. RF electrical power is supplied to the induction coils. The argon does not conduct electricity and so is not heated by the RF electromagnetic field of the induction coils until the plasma is "struck", for example by a small electrical discharge created in the argon by a high voltage spark. This discharge produces enough electrons and ions to interact with the RF electromagnetic field and thereby generates sufficient heat for the process of ion and electron generation to become self-sustaining, thereby sustaining the plasma.

In spectrometry applications the temperature of the plasma is typically in the range 3000K to 10,000K. The frequency of the varying electromagnetic field can be in the range of a few MHz to many GHz, but a particularly useful range, where it is relatively easy to excite the plasma to an appropriate temperature is between 10 MHz and 50 MHz.

The generator for supplying the RF electrical power must be capable of generating sufficient power for exciting and maintaining the plasma, for example in the region of 500 W to 3 kW. It must also be capable of handling rapid and significant changes in the load impedance, as occurs for example when a plasma unexpectedly extinguishes. It must also be able to handle non-constant load impedance conditions as occurs for example between excitation and sustained generation of the plasma.

Another significant factor is the cost of an RF generator in a spectrometry instrument. Spectrometry instrumentation is expensive and the field is competitive, thus there are cost constraints on components such as the RF generator or oscillator if a manufacturer of such instruments is to remain competitive in the market.

An object of the present invention is to provide a relatively inexpensive RF power generator for exciting and sustaining an inductively coupled plasma for spectrometry.

DISCLOSURE OF THE INVENTION

According to the invention there is provided a radio frequency (RF) power generator for an induction coil for exciting an inductively coupled plasma (ICP) for spectrometry including:

a switching circuit connectable across a DC power supply, the switching circuit including solid-state switching devices each having a gate electrode for receiving a gate drive voltage whereby the solid-state switching devices are alternately switchable ON and OFF for supplying RF power;

a load circuit to which the RF power from the switching circuit is coupled, the load circuit including the induction coil and capacitance connected for parallel resonance;

a gate drive circuit for each solid state switching device, each gate drive circuit including a portion that is mutually inductively coupled with a portion of the load circuit for the gate drive circuit to provide the gate drive voltage.

Most advantageously, said portion of the load circuit is a lead of the induction coil.

Preferably the portion of each gate drive circuit that is mutually inductively coupled with a lead of the induction coil is an inductive loop which may extend parallel with the lead of the induction coil.

In an embodiment of the invention, a full-bridge of RF MOSFETs (Metal-Oxide-Semiconductor Field Effect Transistors) switches at the RF frequency and is connected by a coupling network to the parallel connected induction coil and capacitance. The gate drive voltages for the MOSFETs are preferably derived from inductive coupling loops placed adjacent to supporting leads for the plasma induction coil. This arrangement is advantageous because it reduces costs as it uses the supporting leads as primary inductors and thus avoids the need for additional components. Also the inductive coupling loops (ie. secondary inductors) can be relatively cheaply provided, for example via conductive tracks on a printed circuit board. Alternatively the gate drive voltage can be derived from other portions of the load circuit. For example it could be derived from inductors for coupling between the switching circuit and the parallel connected induction coil and capacitance.

The DC supply for the solid-state switching circuit may be derived from an AC utility supply using an AC to DC converter. The AC-DC converter may be isolated or non-isolated and preferably is a two-stage converter, having an AC to DC power factor correcting (PFC) converter followed by an isolated DC-DC converter. A non-isolated DC-DC converter may also be used. Output control for the radio frequency power generator may be by variation of the DC supply voltage, with possibly a second stage of a two-stage converter being utilised for the variation of the output DC voltage. The output variable that is regulated could be output power, current, voltage or some combination of these that changes based on the prevailing plasma conditions. Regulating the current in the induction coil, rather than the power or some other quantity, makes control easy and does not require any change when the plasma is initiated or when it extinguishes. At these times the plasma impedance changes over a large range but regulating the current ensures that a strong magnetic field is present for ignition and keeps the power acceptably constant when the plasma is present.

Compared with prior art solid-state generators, preferred embodiments of the present invention have a higher supply voltage, making parasitic inductances less of a problem, and have good control of overvoltage by the clamping inherent in a full-bridge configuration of the MOSFETs. Such embodiments have advantages over prior solid-state generators using only one or two switching components in that four components are used and the heat loss is distributed between them, making the task of cooling simpler.

Also in some embodiments of the invention, by designing the loads seen by a MOSFET switching device to be such that the MOSFET output capacitance is substantially discharged before the MOSFET is turned on, the efficiency of the power generator circuit can be made very high.

For a better understanding of the invention and to show how it may be performed, embodiments therefore will now be described, by way of non-limiting example only, with reference to the accompanying drawings.

DETAILED DESCRIPTION

Figure 1:
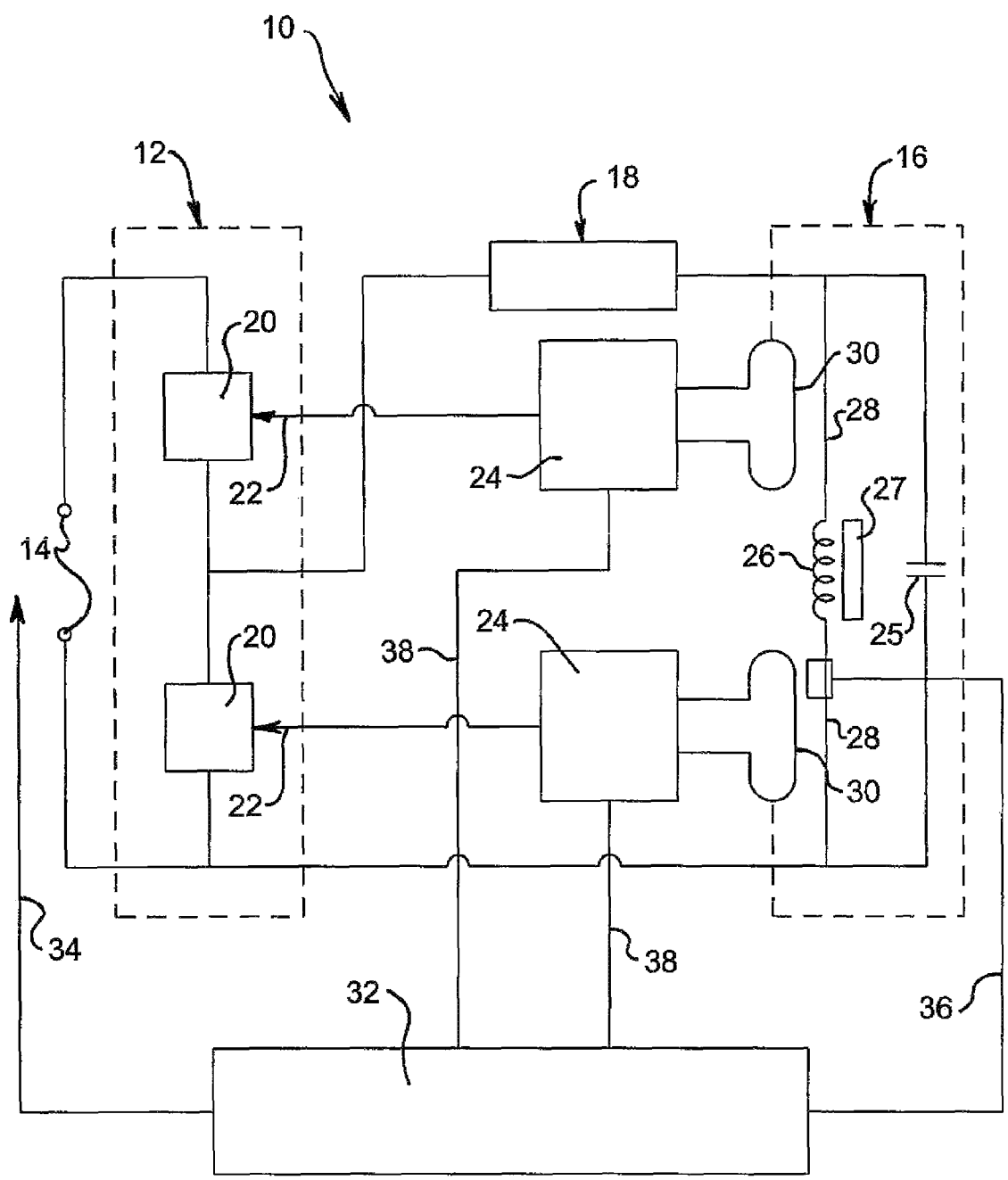
FIG. 1 is a functional block diagram representative of an RF power generator circuit according to an embodiment of the invention.

With reference to FIG. 1, an RF power generator 10 according to an embodiment of the invention includes a switching circuit 12, connectable across a DC supply 14, which supplies RF power to a load circuit 16 via a coupling circuit 18. The switching circuit 12 includes at least two solid-state switching devices 20, each having a gate electrode 22 for receiving a gate drive voltage from respective gate drive circuits 24 for alternately switching the solid-state switching devices 20 ON and OFF for supplying the RF power to the load circuit 16. The load circuit 16 includes an induction coil 26 and a parallel connected capacitor 25. The induction coil 26 is for exciting an ICP in a plasma torch 27 for spectrometry. The induction coil 26 is typically co-axial with a plasma torch 27 through which a plasma forming gas, for example argon, is passed at a controlled flow rate. The induction coil 26 includes supporting leads 28 and each gate drive circuit 24 includes a portion 30 that is mutually inductively coupled with a supporting lead 28 of the induction coil 26 for feedback to the gate drive circuits 24 to provide the gate drive voltages to gate electrodes 22 for switching the solid-state switching devices 20 ON and OFF.

Output of the circuit 10 may be controlled via a microprocessor controller 32 which may vary the DC input supply voltage 14 (see ref. 34) dependent upon a feedback of a load circuit variable, which may be the current in the induction coil 26, as represented by reference 36. The microprocessor controller 32 may also supply bias voltages 38 for the gate drive circuits 24. Once operation of the radio frequency power generator 10 circuit is initiated via the microprocessor controller 32, it is self-oscillating.

Figure 2:
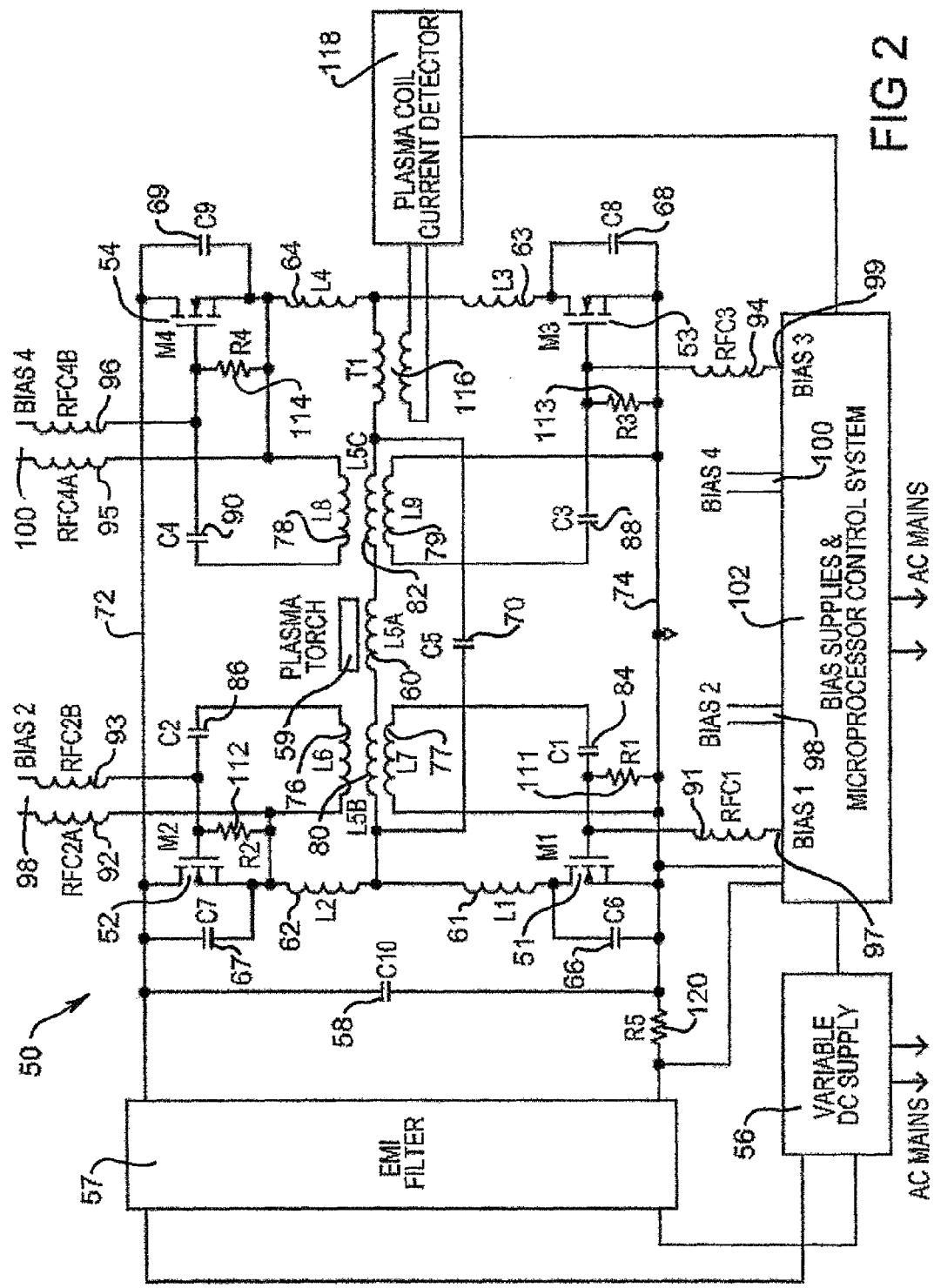
FIG. 2 illustrates a power generator according to a preferred embodiment of the invention which employs a full-bridge of RF MOSFETs.

The embodiment illustrated by FIG. 2 shows a power generator circuit 50 having a full-bridge switching circuit including four RF MOSFETs 51, 52, 53 and 54 (M1, M2, M3 and M4) each being a type DE375-501N21A (IXYS RF) or equivalent. This configuration of MOSFETs can be used to generate an RF power output of about 1.5 to 2.0 kW into the plasma. The incoming DC power supply 56 is bypassed by capacitor 58 (C10) to provide a low impedance return path for the RF current in the induction coil 60 (L5). An EMI filter 57 is located between the DC supply 56 and capacitor 58.

Power is coupled from the full-bridge of MOSFETs 51-54 to the induction coil 60 (L5A) by load coupling inductors 61, 62, 63 and 64 (L1, L2, L3 and L4). In the absence of drain-source capacitors 66, 67, 68 and 69 (C6, C7, C8 and C9), the combination of induction coil 60 (L5A) and associated lead 80 and 82 inductances (L5B, L5C) in parallel with a load capacitor 70 (C5) and the series combination of load coupling inductors 62 and 63 (L2 and L3) when MOSFETs 52 (M2) and 53 (M3) are conducting (or load coupling inductors 61 and 64 (L1 and L4) when MOSFETs 51 (M1) and 54 (M4) are conducting) is designed to be resonant at the intended operating frequency, typically in the frequency range 13 MHz to 50 MHz. The optimum values for these components will depend on the inductance of the induction coil 60 (L5A), the coupling to the plasma in a plasma torch 59 within the induction coil 60 and the temperature and size of the plasma, so they can be determined by simulation and experimentation. The components must be designed to be capable of carrying the high RF currents in this part of the power generator circuit 50. A small amount of parasitic inductance in the load capacitor 70 (C5) does not materially affect circuit operation.

Drain-source capacitors 66, 67, 68 and 69 (C6, C7, C8 and C9) are connected from drain to source on MOSFETs 51, 52, 53 and 54 (M1, M2, M3 and M4). They are used to limit the drain-source voltage excursion on the MOSFETs. Their value is a compromise between limiting the drain-source voltage and reduced power conversion efficiency caused by the need for the MOSFETs to discharge them every cycle. Their presence also increases the operating frequency of the power generator circuit 50 as the series combination of the drain-source capacitor 66, 67, 68 or 69 with the load coupling inductor 61, 62, 63 or 64 (L1, L2, L3 or L4) on a non-conducting MOSFET 51, 52, 53 or 54 effectively appears in parallel with the load coupling inductor of the adjacent conducting MOSFET. For example, when MOSFET 52 (M2) is conducting, the series combination of load coupling inductor 61 (L1) and capacitor 66 (C6) connected to non-conducting MOSFET 51 (M1) is effectively in parallel with load coupling inductor 62 (L2) since both power supply rails 72, 74 are held at the same RF potential by bypass capacitor 58 (C10).

Gate drive for the MOSFETs 51, 52, 53 and 54 (M1, M2, M3 and M4) is obtained by inductive feedback from the load circuit. It is derived from coupling loops 77, 76, 79 and 78 (L7, L6, L9 and L8) respectively which are mutually inductively coupled to inductors 80 and 82 (L5B and L5C) which are provided by the supporting leads to the plasma induction coil 60 (L5A). Coupling loops 76 and 77 (L6 and L7) are coupled to supporting lead 80 (L5B), whereas coupling loops 78 and 79 (L8 and L9) are coupled to supporting lead 82 (L5C). The phasing of the connections to the coupling loops 76, 77, 78 and 79 (L6, L7, L8 and L9) is such that MOSFETs 52 and 53 (M2 and M3) conduct simultaneously with MOSFETs 51 and 54 (M1 and M4) non-conducting. On the opposite phase of the oscillation cycle at the operating frequency, MOSFETs 51 and 54 (M1 and M4) conduct while MOSFETs 52 and 53 (M2 and M3) are in the non-conducting state.

Alternatively, instead of the leads 80 and 82, inductive feedback can be obtained from the coupling inductors 61, 62, 63 and 64 (L1, L2, L3 and L4). In this embodiment the gate drive inductors 76, 77, 78 and 79 (L6, L7, L8 and L9) are mutually inductively coupled with the coupling inductors 62, 61, 64 and 63 (L2, L1, L4 and L3) respectively.

The gate drive circuits include gate capacitors 84, 86, 88 and 90 (C1, C2, C3 and C4) which perform two functions. They provide a DC blocking function to prevent the shortcircuiting of the bias supplies to MOSFETs 51, 52, 53 and 54 (M1, M2, M3 and M4). The gate capacitors 84-90 also are used to set the resonant frequency of the respective gate drive circuits comprising the inductance of coupling loops 76, 77, 78 and 79 (L6, L7, L8 and L9) and the series combinations of the gate capacitors 84, 86, 88, 90 (C1, C2, C3 and C4) with the gate input capacitances of the respective MOSFETs 51, 52, 53 and 54 (M1, M2, M3 and M4). The resonant frequency of the gate drive circuits is typically set higher than the operating frequency to maximise the DC to RF power conversion efficiency of the power generator 50.

Gate-source bias voltages for the MOSFETs 51, 52, 53 and 54 (M1, M2, M3 and M4) are coupled via radio frequency chokes 91, 92, 93, 94, 95 and 96 (RFC1, RFC2A, RFC2B, RFC3, RFC4A and RFC4B) from DC bias supplies 97, 98, 99 and 100 controlled by a microprocessor control system 102. Resistors 111, 112, 113 and 114 (R1, R2, R3 and R4) respectively are connected between the gate and source of each MOSFET 51, 52, 53 and 54 and set the gate-source bias voltage to zero in the absence of bias from the microprocessor controlled bias supplies 97-100 to ensure that the MOSFETs 51-54 do not conduct until bias is applied to initiate oscillation of the power generator circuit 50.

It is most convenient to control the RF current in the induction coil 60 (L5A) to control the temperature of the plasma in the plasma torch 59. This function is readily performed by use of an RF current transformer 116 (T1) with its primary winding connected in series with the resonant circuit formed by induction coil 60 (L5A), its associated supporting leads 80 and 82 (L5B and L5C) and capacitor C5. The output from the secondary winding of current transformer 116 (T1) may be connected to a ballast resistor and then rectified in a plasma coil current detector 118 to generate a DC feedback signal which may be measured by an analog to digital convertor in the microprocessor control system 102. In turn, the microprocessor control system 102 controls the output voltage of the variable DC supply 56 that provides DC power to the power generator circuit 50. By this means, the RF current in the induction coil 60 (L5A) is stabilised.

Figure 3:
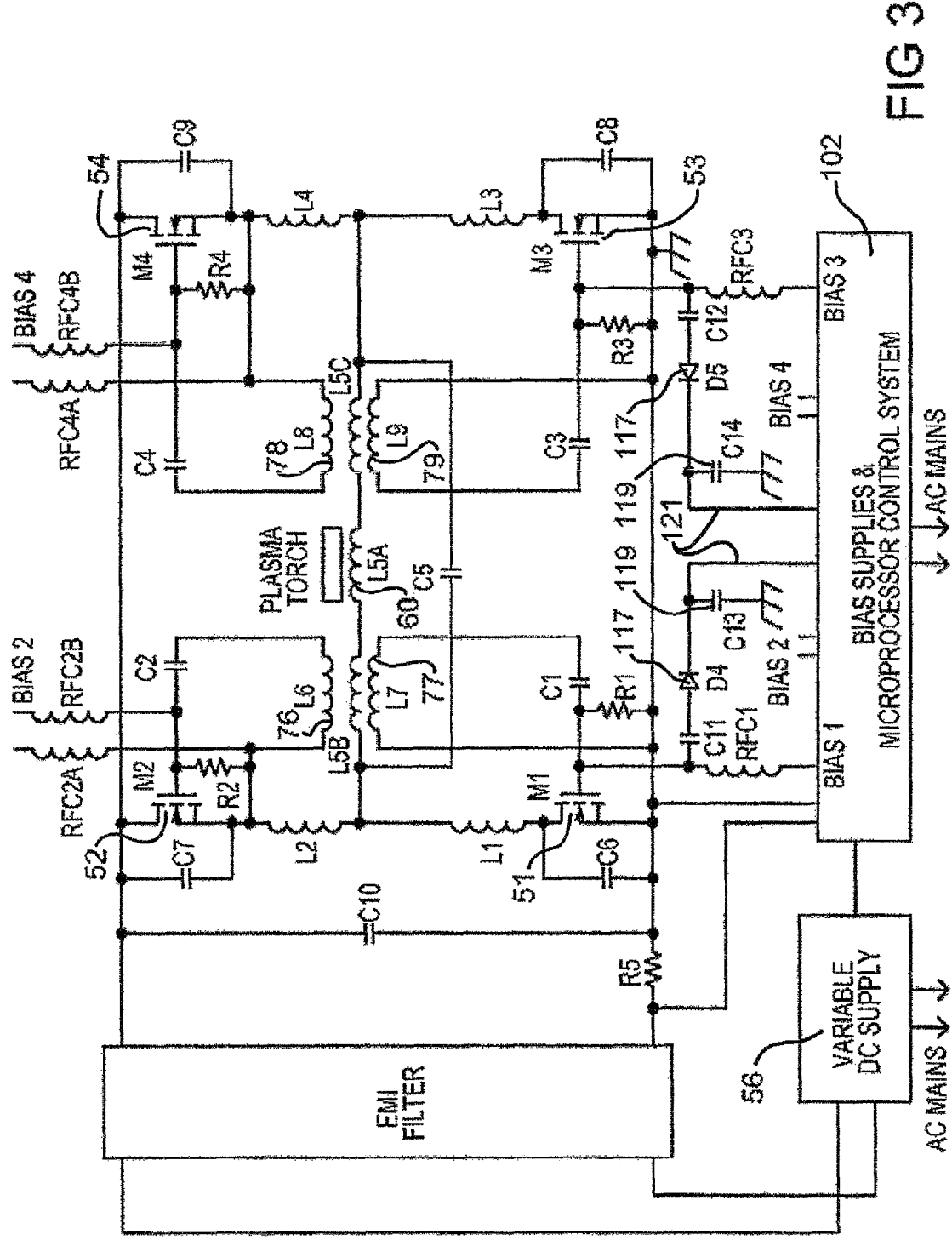
FIG. 3 shows the generator circuit of FIG. 2 but which includes a modification for controlling the RF load current.

An alternative (illustrated by FIG. 3) for controlling the RF current in the induction coil 60 is by measurement of the gate-source voltages on some or all of the MOSFETs 51, 52, 53, 54 as this voltage is derived from the gate coupling inductors 76, 77, 78, 79 and is therefore proportional to the current in the induction coil 60. As shown in FIG. 3, gate voltage detection circuits comprising conventional diode rectifiers 117 (D4, D5) and capacitors 119 (C13, C14) is used to generate DC voltages on lines 121 which are measured by the microprocessor control system 102 and used in turn to control the DC supply 56, thereby stabilising the RF current in induction coil 60.

Direct analog control of the variable supply from the plasma detector output is also possible. The microprocessor control system 102 also monitors the DC supply current drawn by the RF power generator 50 by measuring the voltage drop across a current sense resistor 120 (R5). By this means, additional protection is afforded to the RF power generator 50 components in the event of an arc forming across the induction coil 60. The variable DC supply 56 and microprocessor control system 102 are both powered from an AC mains utility supply.

Figure 4:
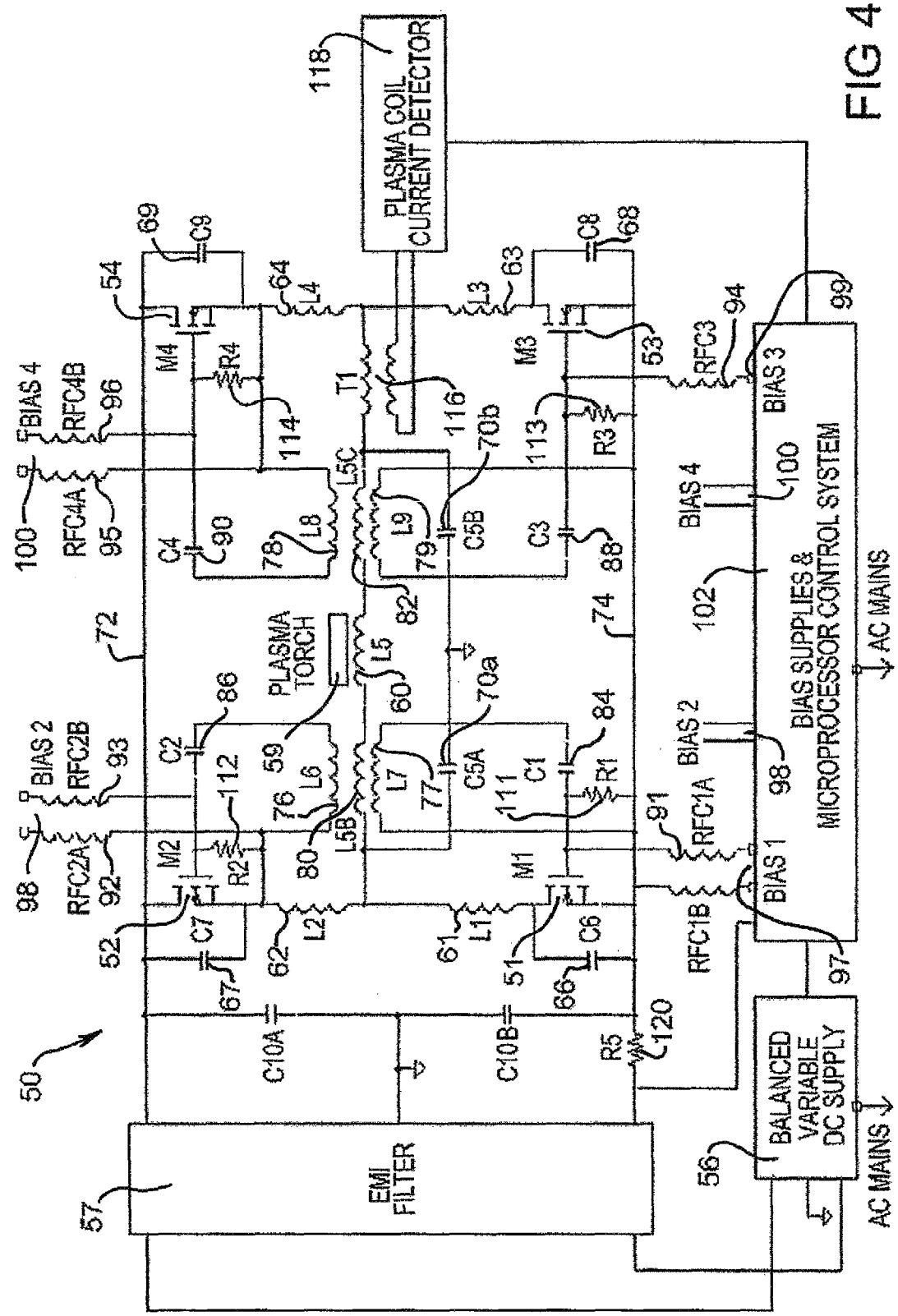
FIG. 4 shows another modification for the generator circuit of FIG. 2 which employs a capacitive divider in the load circuit.

FIG. 4 (in which similar referencing for similar components as in FIG. 2 has been used) shows a further embodiment for a solid state RF power supply 50 which uses, instead of the resonating capacitor 70 (C5), a capacitive divider of capacitors 70a and 70b (C5A and C5B) which, by balancing the induction or work coil 60 potential with respect to ground potential, minimises the plasma potential. For this embodiment, it is necessary to use a variable DC supply 56 which is balanced about ground potential. In all other respects, operation of this version of the RF power generator 50 is identical to that shown in FIG. 4.

The microprocessor control system 102 is instrumental in starting the RF power generator 50. It controls the gate-source bias supplies 97, 98, 99 and 100 that initiate conduction of MOSFETs 51, 52, 53 and 54 (M1, M2, M3 and M4). To start the RF power generator 50, the microprocessor control system 102 initially sets the variable DC supply 56 to a reduced voltage (for example, 50 volts) and then gradually increases the gate bias supplies 97, 98, 99 and 100 to the gate threshold voltage to initiate conduction as measured by voltage drop across current sense resistor 120 (R5). At this point, oscillation is established and the variable DC supply 56 output voltage can be increased to the final operating value (for example, 200 volts). The plasma discharge is initiated by an ionising spark discharge into the argon gas flow to the plasma torch 59 as is known for plasma systems.

Use of the supporting leads 80, 82 of the induction coil 60 as primary inductors for the inductive feedback for the gate drive circuits offers several advantages. First it reduces componentry. Also further simplification is possible in that the coupling loops 76, 77, 78 and 79 can be readily provided, for example via an appropriately shaped strip of copper, or via conducting tracks on a printed circuit board (to be described below). The coupling loops 76, 77, 78 and 79 also have low inductance and this permits direct gate drive of the MOSFETs 51, 52, 53, 54 (M1, M2, M3, M4); that is, there is no need for amplifying componentry in the gate drive circuits.

Example componentry values for the circuit of FIG. 2 are:

| CCT REF | PART DESCRIPTION | | VALUE |
|---|---|---|---|
| 66, 67, 68, 69 | DRAIN-SOURCE CAPACITORS | (C6, C7, C8, C9) | 160 pF |
| 61, 62, 63, 64 | TANK FEED INDUCTORS | (L1, L2, L3, L4) | 450 nH |
| 84, 86, 88, 90 | GATE COUPLING CAPACITORS | (C1, C2, C3, C4) | 1.2 nF |
| 76, 77, 78, 79 | GATE PCB INDUCTORS | (L6, L7, L8, L9) | 30 nH |
| 60 | INDUCTION (WORK) COIL | (L5A) | 270 nH |
| 80, 82 | INDUCTION (WORK) COIL LEGS | (L5B, L5C) | 13 nH |
| 70 | TANK CAPACITOR | (C5) | 200 pF |
| 111, 112, 113, 114 | GATE-SOURCE RESISTORS | (R1, R2, R3, R4) | 10K |
| 91, 92, 93, 94, 95, 96 | BIAS INDUCTORS | (RFC1, RFC2A, RFC2B, RFC3, RFC4A, RFC4B) | 220 uH |
| 77 & 76 to 80 | GATE L COUPLING COEFFICIENT | L6/L7 TO L5B | 0.035 |
| 78 & 79 to 82 | | L8/L9 TO L5C | 0.035 |

For an RF power generator 50 as exemplified above, typical DC-RF power conversion efficiency is better than 80% at a DC supply voltage of 190 volts.

Figure 5:
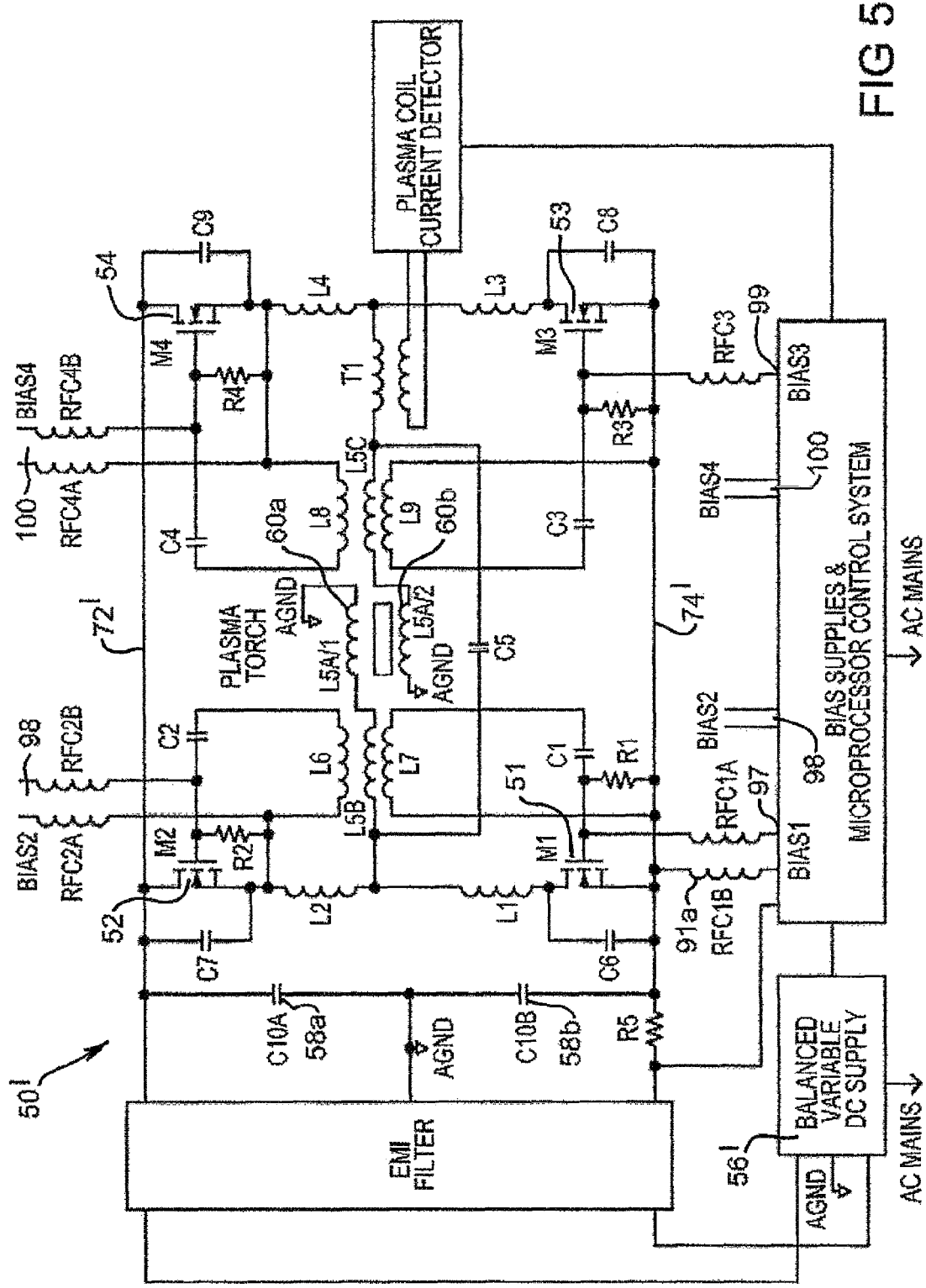
FIG. 5 illustrates another embodiment of a power generator according to the invention using mutually coupled interlaced plasma induction coils.

FIG. 5 (in which similar referencing for similar components as in FIG. 2 has been used) shows an alternative embodiment for a solid state RF power supply 50' using mutually coupled, interlaced plasma induction coils 60a and 60b (L5A/1, L5A/2) as described by Turner (U.S. Pat. No. 5,194,731). In this configuration it is necessary to employ a DC power supply 56' balanced about ground potential. Two power supply bypass capacitors 58a and 58b (C10A, C10B) are needed in this configuration. An additional RF choke 91a (RFC1B) is also needed to establish a bias voltage reference point as the bias supplies 97 and 99 for MOSFETs 51 and 53 (M1 and M3) must now float relative to the negative DC power supply rail 74' rather than being referred to ground potential as in the embodiment in FIG. 2. In all other respects, operation of this version of the RF power generator 50' is identical to that shown in FIG. 2.

A power factor correcting boost and DC-DC converter for the variable DC supply 56 can be built according to well established techniques or a complete converter can be purchased as a unit from a power supply manufacturer. There are no special requirements for this application except that the output voltage be approximately 200V.

Figure 6:
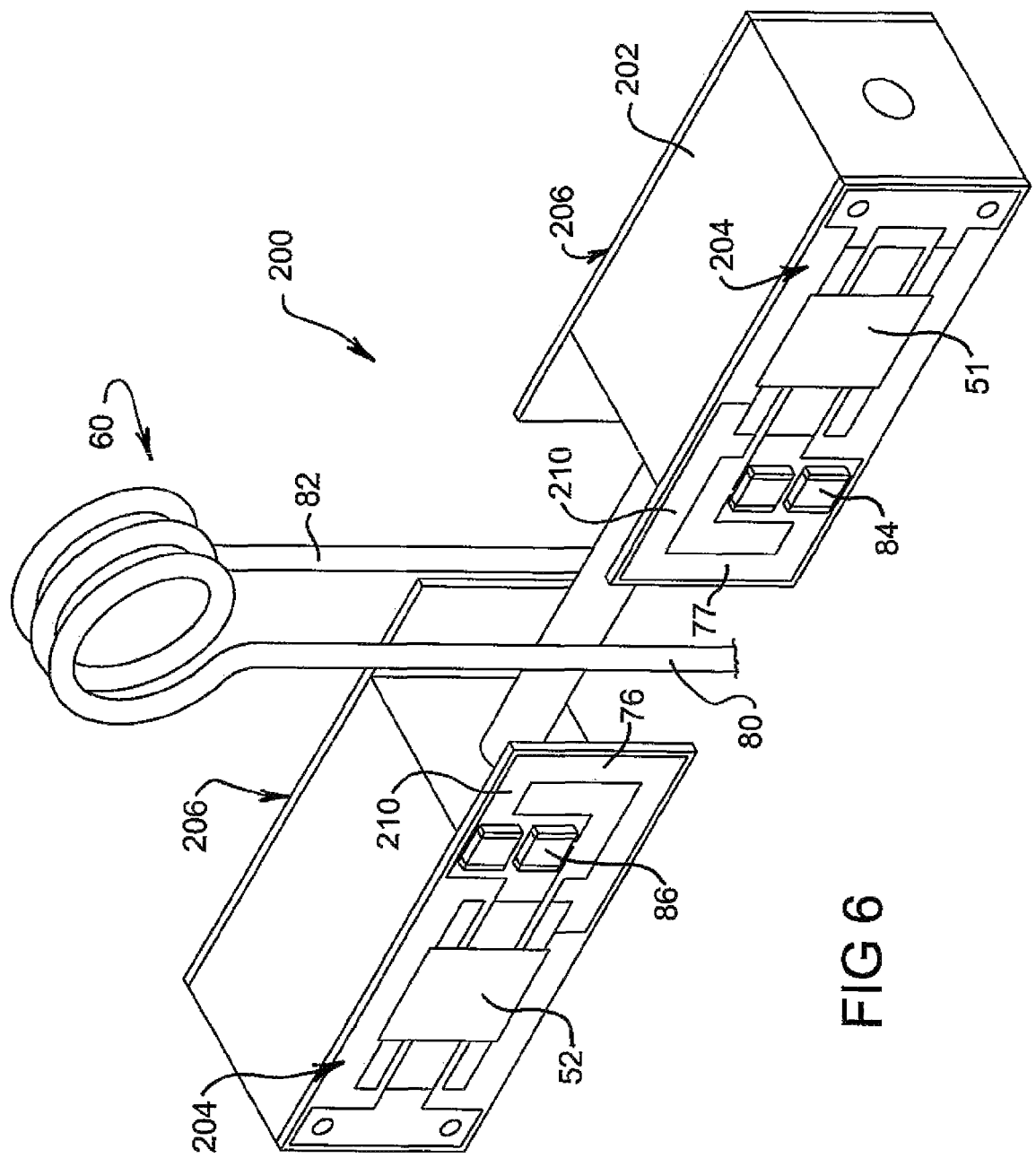
FIG. 6 is an isometric illustration of portion of a structure for an embodiment of the invention showing inductive loop portions of the gate drive circuitry.

With reference to FIG. 6 (in which the same reference numerals for the same components as in FIG. 2 have been used), portion of a structure 200 for a power supply 50 according to the FIG. 2 embodiment of the invention includes a frame 202 that supports two pairs of oppositely facing printed circuit boards 204, 206. The induction coil 60 within which a plasma torch (not shown) is locatable, includes leads 80 and 82 which structurally support the induction coil 60 relative to the assembly 200 of the printed circuit boards 204, 206 and frame 202. The induction coil 60 and its leads 80 and 82 may be formed from copper tubing through which a coolant flows in operation of the power generator 50.

The printed circuit boards 204 include conducting tracks 210, each having a portion which is located adjacent the lead 80 and extends parallel to it and which provide, respectively, the inductive coupling loops 76 (L6) and 77 (L7). The capacitors 84 (C1) and 86 (C2) and the MOSFETs 51 (M1) and 52 (M2) are discrete components mounted over the conducting tracks 210 on the printed circuit boards 204. A similar arrangement (not visible in FIG. 6) for the coupling loops 78, 79 relative to lead 82, and capacitors 88, 90 (C3, C4) and MOSFETs 53 and 54 (M3 and M4) is provided by the other printed circuit boards 206. For clarity of illustration of the inductive coupling loops 76, 77 arrangement relative to the supporting leads 80, 82 of the induction coil 60, various additional components have been omitted from the FIG. 6 illustration. These omitted components include the capacitors 70, 66, 67, 58 (C5, C6, C7, C10), inductors 61, 62 (L1, L2), resistors 111, 112 (R1, R2), and radio frequency chokes 91, 92 and 93 (RFC1, RFC2A, RFC2B).

A circuit topology in which the inductive coupling loops 76, 77, 78 and 79 are provided via conducting tracks 210 on printed circuit boards 204 and 206 allows for an easily achievable and cost effective construction.

The invention described herein is susceptible to variations, modifications and/or additions other than those specifically described and it is to be understood that the invention includes all such variations, modifications and/or additions which fall within the scope of the following claims.

The invention claimed is:

1. A radio frequency (RF) power generator for an induction coil for exciting an inductively coupled plasma (ICP) for spectrometry comprising:
   a switching circuit connectable across a DC power supply, the switching circuit comprising solid-state switching devices each having a gate electrode for receiving a gate drive voltage, whereby the solid-state switching devices are alternately switchable ON and OFF for supplying RF power;
   a load circuit to which the RF power from the switching circuit is coupled, the load circuit comprising the induction coil and capacitance connected for parallel resonance; and
   a gate drive circuit for each solid state switching device, each gate drive circuit including a portion that is mutually inductively coupled with a portion of the load circuit for the gate drive circuit to provide the gate drive voltage.

2. The RF power generator as claimed in claim 1, wherein said portion of the load circuit is a lead of the induction coil.

3. The RF power generator as claimed in claim 2, wherein said portion of each gate drive circuit is an inductive loop.

4. The RF power generator as claimed in claim 3, wherein the inductive loop extends parallel with the lead of the induction coil.

5. The RF power generator as claimed in claim 4, wherein each inductive loop is provided by a conductive track on a printed circuit board.

6. The RF power generator as claimed in claim 1, wherein the solid-state switching devices are insulated gate field effect transistors (MOSFETs).

7. The RF power generator as claimed in claim 1, wherein the switching devices include four MOSFETs arranged in a full-bridge configuration.

8. The RF power generator as claimed in claim 1, icomprising a DC voltage supply, wherein the DC voltage is variable for varying the output of the power generator.

9. The RF power generator as claimed in claim 8, wherein the DC voltage is variable dependent upon a measured variable from the load circuit.

10. The RF power generator as claimed in claim 9, wherein the measured variable from the load circuit is the RF current in the induction coil resonant circuit.

11. The RF power generator as claimed in claim 8, wherein the DC voltage is variable dependent upon the gate drive voltage of at least one of the solid state switching devices.

12. The RF power generator as claimed in claim 11 wherein the DC voltage supply includes an AC to DC converter, which is connectable to an AC utility supply.

13. The RF power generator as claimed in claim 12, wherein the AC-DC converter is a two stage converter having an AC-DC power factor correcting converter followed by a DC-DC converter.

* * * * *

UNITED STATES PATENT AND TRADEMARK OFFICE
CERTIFICATE OF CORRECTION

| | | |
|---|---|---|
| PATENT NO. | : 7,852,471 B2 | Page 1 of 1 |
| APPLICATION NO. | : 12/300783 | |
| DATED | : December 14, 2010 | |
| INVENTOR(S) | : Steven William Hosemans | |

It is certified that error appears in the above-identified patent and that said Letters Patent is hereby corrected as shown below:

In column 8, lines 41-42, in Claim 8, delete "icomprising" and insert -- comprising --, therefor.

Signed and Sealed this
Fifteenth Day of March, 2011

David J. Kappos
*Director of the United States Patent and Trademark Office*